United States Patent [19]

Ooms et al.

[11] Patent Number: 5,020,017

[45] Date of Patent: May 28, 1991

[54] METHOD AND APPARATUS FOR OBTAINING THE QUOTIENT OF TWO NUMBERS WITHIN ONE CLOCK CYCLE

[75] Inventors: William J. Ooms, Chandler, Ariz.; Clifford D. Leitch, Coral Springs, Fla.; Rene M. Delgado, Austin, Tex.

[73] Assignee: Motorola, Inc., Schaumburg, Ill.

[21] Appl. No.: 584,399

[22] Filed: Sep. 17, 1990

Related U.S. Application Data

[63] Continuation of Ser. No. 335,319, Jun. 6, 1988, abandoned.

[51] Int. Cl.⁵ .............................................. G06F 7/52
[52] U.S. Cl. ..................................... 364/761; 364/765
[58] Field of Search ................ 364/754, 761, 764, 765

[56] References Cited

U.S. PATENT DOCUMENTS

| | | | |
|---|---|---|---|
| 3,648,038 | 3/1972 | Sierra | 364/765 |
| 4,567,568 | 1/1986 | Inagawa et al. | 364/765 |
| 4,607,343 | 8/1986 | Chevillat et al. | 364/765 |
| 4,636,973 | 1/1987 | Cantwell | 364/764 |
| 4,718,031 | 1/1988 | Nukiyama | 364/754 |
| 4,718,032 | 1/1988 | Irukulla et al. | 364/765 |
| 4,823,301 | 4/1989 | Knierim | 364/761 |

OTHER PUBLICATIONS

"WTL 1032/1033, Floating Point Division/Square Root/IEEE Arithmetic", A Publication of Weitek, 1983, pp. 1-10.

Primary Examiner—Dale M. Shaw
Assistant Examiner—Long T. Nguyen
Attorney, Agent, or Firm—Robert S. Babayi

[57] ABSTRACT

A divider circuit for producing a quotient result within one cycle time is provided. The invention utilizes combinational circuitry for performing a division operation by computing a scaled reciprocal of the denominator, and multiplying the scaled output by a similarly scaled numerator. The denominator is scaled such that it falls within a predetermined range, and the reciprocal value may be looked up from a memory device such as a ROM. The output of the multiplier may also be scaled in order to produce the desired result. The resulting quotient has a controlled error over a wide range of numerator and denominator input values.

4 Claims, 6 Drawing Sheets

METHOD AND APPARATUS FOR OBTAINING THE QUOTIENT OF TWO NUMBERS WITHIN ONE CLOCK CYCLE

This is a continuation of application Ser. No. 07/335,319 filed Jun. 6, 1988 and now abandoned.

TECHNICAL FIELD

This invention relates generally to the field of signal processing, and more particularly to circuits that perform division operations on binary integer inputs.

BACKGROUND ART

In digital signal processing applications, it may be desired to implement an integer divide function in the hardware of a digital circuit to perform specific function. In a typical application, a divider circuit is included in a portion of an AM receiver. A digital to analog converter in the receiver samples a received signal and a reference signal at a certain rate, and the divider performs a normalization operation by dividing the received input signal by the reference signal. The division operation is continuous (real time) and is performed within a portion of the sampling period. The received signal constitutes the numerator input N and the reference signal constitutes the denominator input D of the divider. However, the result of a division operation may not be an exact value, and a certain error may be present in the resulting quotient.

Figure 1:
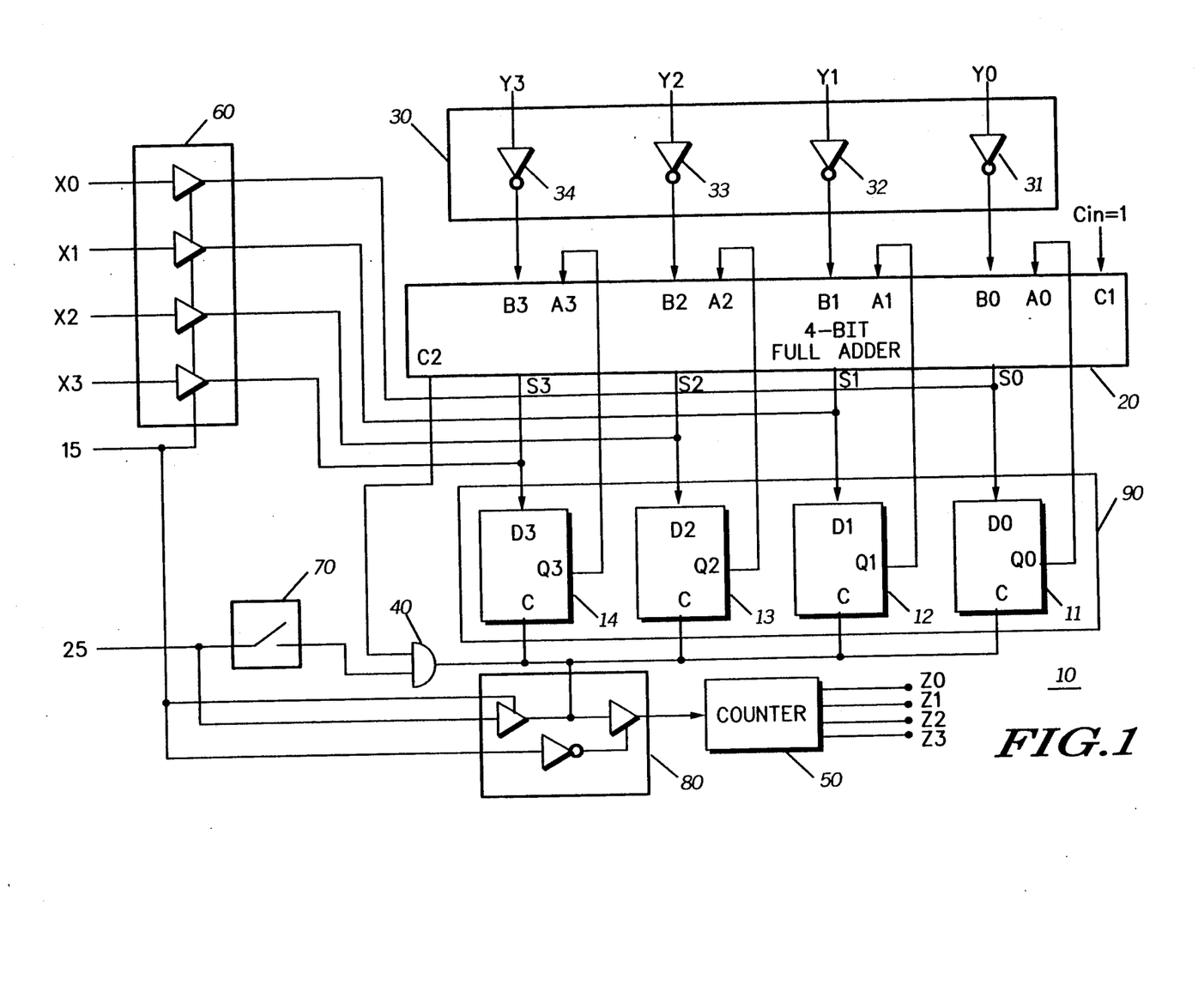
FIG. 1, is a circuit schematic diagram of a prior art 4-bit by 4-bit divider circuit.

FIG. 1 shows a conventional 4 bit by 4 bit divider circuit, which divides, using repeated subtraction, a four-digit dividend X represented by bits X3-X0 by a divisor Y represented by Y3-Y0. The dividend X is loaded into a register 90 via buffers 61, 62, 63, and 64 of a tri-state buffer device 60, having a control input 15. The control input 15, in association with circuitry shown in block 80, allows the dividend X to be loaded in to register 90 only in the initial step of the division operation. The register 90 consists of four type-D flip flops 11, 12, 13, and 14 having outputs Q0, Q1, Q2, and Q3 coupled to first inputs A0, A1, A2, and A3 respectively of a four bit full adder 20. The divisor Inputs Y3-Y0 are coupled to inverters 31, 32, 33, and 34 of an inverting device 30, and will produce the ones complement of the divisor Y. The outputs of the inverting device 30 are coupled to second inputs B0, B1, B2, and B3 of the adder 20. The output of an AND gate 40 is coupled to clock input of the register 90, while inputs of the AND gate 40 are coupled to carry output C2 of the adder 20, and a clock signal 25. Carry input C1 of the adder 20 is set to a logic 1, in order to produce a two complete of the Y input. The output of the AND gate 40 is coupled to a 4-bit counter 50 having an output Z, represented by Z3-Z0. The counter 50 has an initial setting of 0, after dividend X is loaded in to register 90.

Assuming that X>Y, the C2 output initially will be set to 1, and hence the AND gate 40 is enabled. The difference X−Y appears at outputs S3, S2, S1, and S0 of the adder 20. After closing the clock switch 70, the first clock pulse will load the difference X−Y into the register, and will also advance the counter 50 by one step. The numeric output of the adder 20 will be equal to [(X−Y)−Y], or (X−2Y). If C2 is still a logic 1, the AND gate 40 will be enabled and the second clock pulse will load X−2Y into the register and advance the counter a second step. If after n clock pulses the remainder becomes less than Y, then C2 becomes a logic 0. The AND gate 40 will now be disabled and the counter 50 will stop. Hence the quotient Z is read from the counter.

In some digital signal processing circuits, it is necessary to perform the division operation within one clock cycle. The divider circuit 10 operates in a sequential mode, therefore it is not desirable in applications, wherein division speed is critical.

Furthermore, in a digital division operation of two integer binary numbers the result is truncated, in order to provide an integer quotient. However, for the purpose of normalizing amplitudes of signals, it is desirable to have a relatively constant error over a wide range of input amplitudes.

Another disadvantage of a sequential circuit, such as the divider 10, is that it consumes more power than an equivalent combinational logic circuit. This is primarily due to multiple clocking nature of the divider 10.

SUMMARY OF THE INVENTION

Accordingly, it is an object of the present invention to provide a divider circuit capable of performing division operations within one clock cycle.

It is another object of the invention to provide a divider circuit having a controlled error over a wide range of inputs.

Briefly, according to the invention, a divider circuit for producing a quotient output is provided having a numerator input and a denominator input. A scale factor is derived from the magnitude of denominator input. The scale factor scales the denominator so as to produce a scaled denominator in a predetermined range. The scaled denominator output is coupled to a means for reciprocating the scaled denominator to produce a scaled denominator reciprocal. A means for multiplying two inputs is coupled to the numerator input, and the reciprocal of the scaled denominator to produce a scaled quotient.

DETAILED DESCRIPTION OF THE PREFERRED EMBODIMENT

Figure 2:
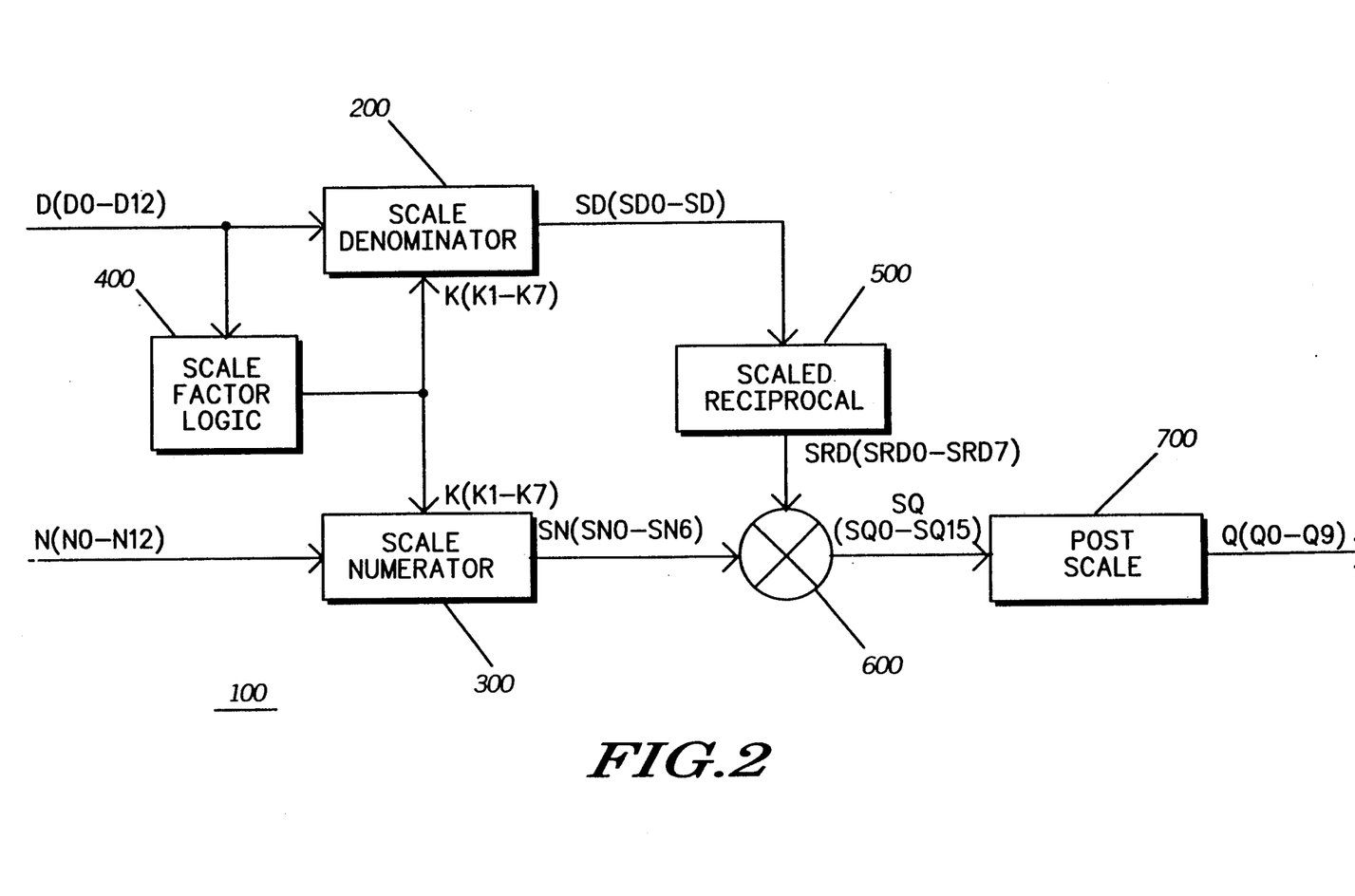
FIG. 2, is a schematic block diagram of a divider circuit according to the present invention.

Referring to FIG. 2, the block diagram of an integer divider 100 is shown. The divider 100 accepts an integer numerator input N and an integer denominator input D, and produces an integer quotient output Q. The quotient output Q represents the result of dividing the numerator N by the denominator D. The denominator D and the numerator N are limited to a predetermined range. In the preferred embodiment of the divider 100, the denominator D is a 13-bit binary number represented by bits D0–D12, and the numerator is a 16-bit binary number represented by bits N0-N15. The denominator D is a positive binary number, and the numerator N is a signed binary number. The invention can be adapted to handle signed denominators by detecting the presence of a negative denominator, and inverting the sign of both the numerator and the denominator. The denominator D has been selected to be within the range of 64 to 8,191, and the numerator has been selected to be within the range of −16,384 to +16,383. It should be noted that these ranges are arbitrary and the invention can be made to function in any desired ranges.

A scale factor K is computed in block 400, based on the magnitude of the denominator D. The implementation and operation of this block is discussed in conjunction with FIG. 3. The scale factor K is a value represented by K1-K7, which is used to scale down the denominator D and the numerator N. Scaling will be done by powers of two, since scaling by power of two is accomplished by shifting of binary numbers. Accordingly, the block 400 constitutes a means for providing a scale factor, wherein the scale factor is derived from the denominator magnitude.

Figure 4:
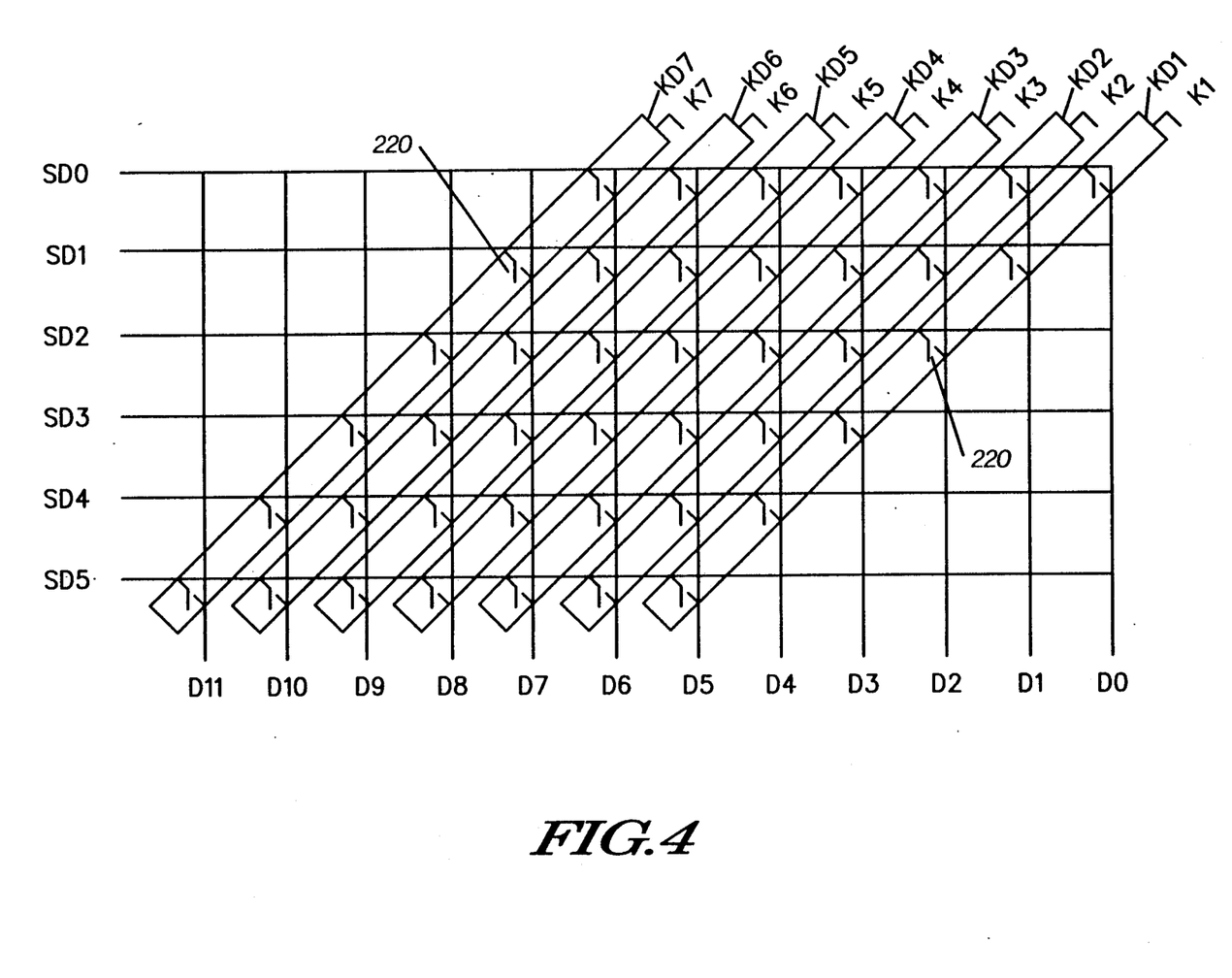
FIG. 4, is a schematic diagram of a preferred denominator scaling circuit.

The denominator D is scaled by power of 2 in block 200, implementation and operation of which is described in conjunction with FIG. 4. The denominator D is scaled by a factor of K as determined in block 400. The scaled denominator SD is a value within a predetermined range of 64 to 127, and is represented by SD0-SD5. Accordingly, block 200 constitutes a means for scaling the denominator.

Figure 6:
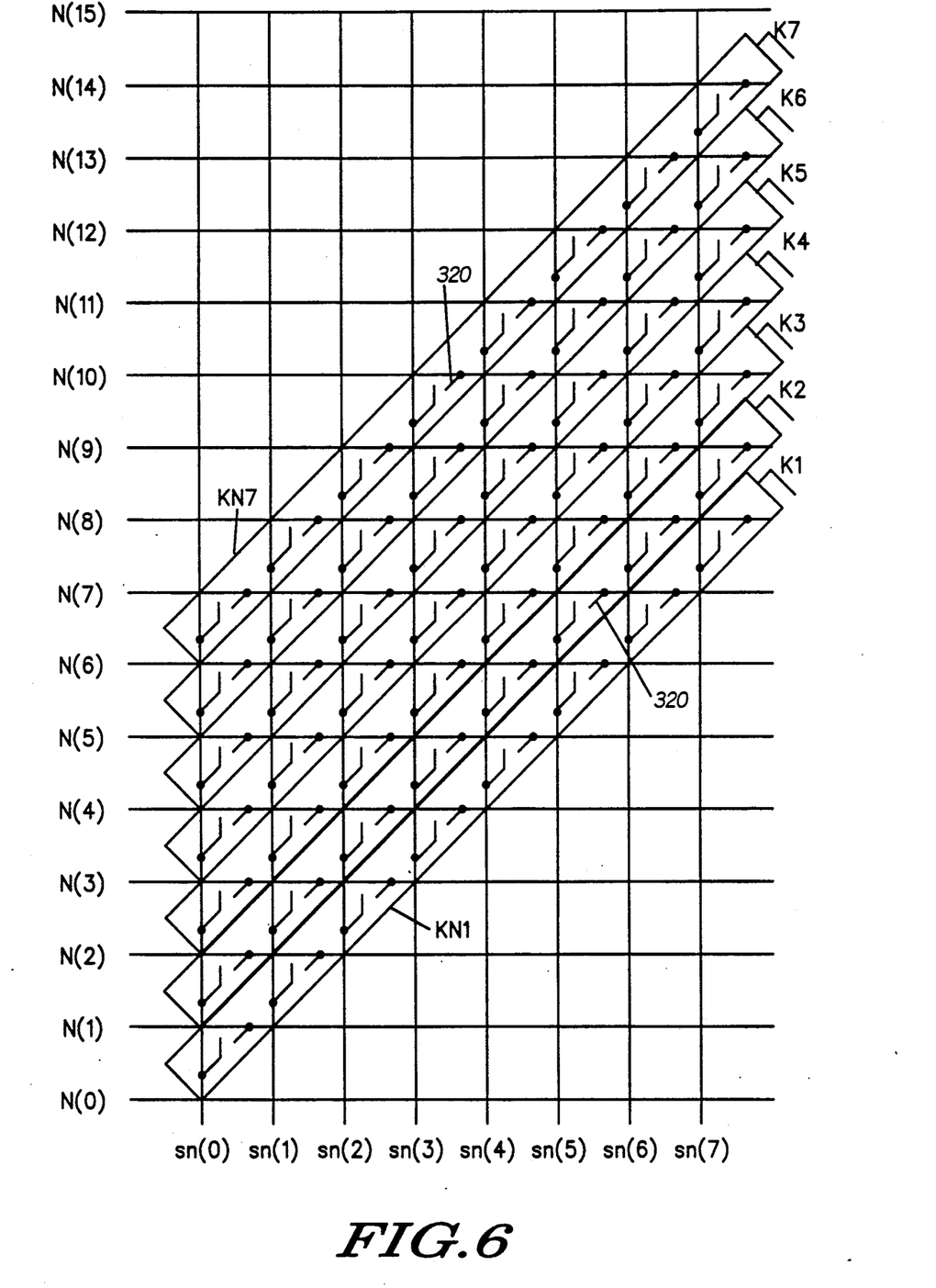
FIG. 6, is a schematic diagram of a preferred a numerator scaling circuit.

The numerator N is scaled by power of 2 in block 300, implementation and operation of which is described in conjunction with FIG. 6. The numerator N is scaled by factor of 2 * K, and produces a 8-bit scaled numerator SN represented by SN0-SN7. The scaled numerator SN is ranged between −127 to +128. The most significant bit SN7 represents the sign of the numerator N. The implementation and operation of scaling the numerator is similar to that of the denominator. Accordingly, block 300 constitutes a means for scaling the numerator.

A block 500 provides the reciprocal of the scaled denominator SD. Since the reciprocal of the scaled denominator SD is not an integer number, therefore block 500 provides for multiplying the result of reciprocation by an arbitrary constant factor, so as to produce an integer scaled denominator reciprocal SRD represented by SRD7-SRD0. The hardware implementation of block 500 is described in conjunction with FIG. 7. Accordingly, the block 500 constitutes a mean for reciprocating the scaled denominator output.

A multiplier 600 is used to multiply the scaled numerator SN by the scaled denominator reciprocal SRD, and provides a scaled quotient SQ represented by SQ0-SQ15. Due to various scale factors used a post scaling block 700 may be added for scaling of the scaled quotient SQ by a constant factor. In some application it may not be necessary to obtain the exact result of the division operation, instead a relative quotient result may suffice. A person of ordinary skill in the art will appreciate that the scaling of the numerator N, or the scaled quotient SQ or both may not be incorporated in the divider 100, if a relative division result is desired.

In the hardware implementation of the preferred divider 100, each block comprise combinational logic circuit. The use of combinational logic provides for a substantially faster divider circuit, as well as efficiency in power consumption.

Figure 3:
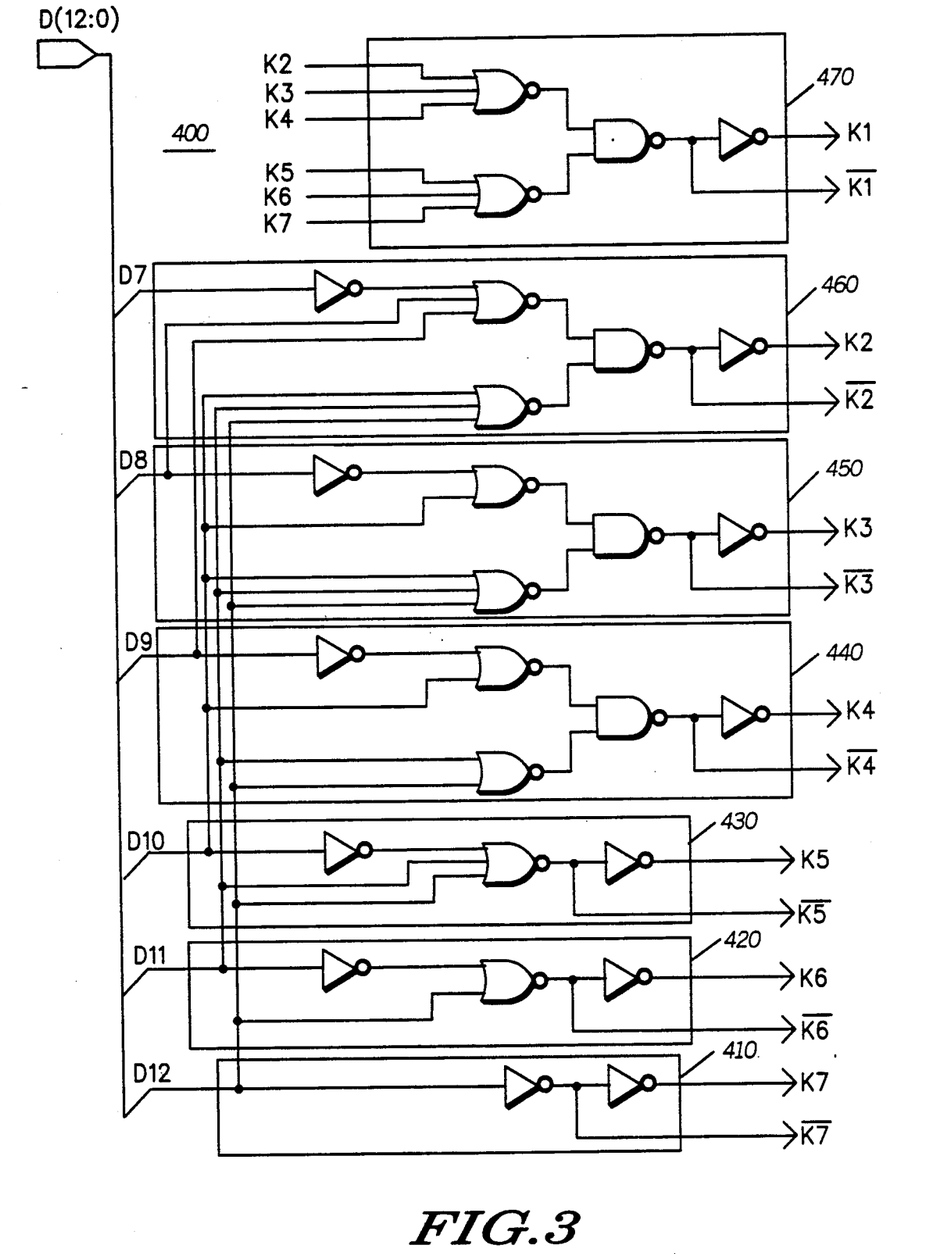
FIG. 3, is a schematic diagram of a preferred scale factor circuit.

Referring to FIG. 3, a preferred hardware implementation of scale factor block 400 of FIG. 2 is shown. Operationally, the scale factor circuit 400 detects the leftmost logic 1 in the 6 most significant bits D12-D6 of the denominator D, and provides a scale factor K represented by scale factor bits K7-K1. The denominator input bits D12-D6 are coupled to combinational logic blocks 410-460, respectively, and provide complimentary output bits K2bar-K7bar and K2-K7. The most significant bit D12 of the denominator D is coupled to a block 410, which comprise known logic gates in order to determine if bit D12 is a logic 1 or a logic 0. If D12 is a logic 1 then K7 will be set (logic 1), and bits K6-K1 will be cleared (logic 0). Similarly, D11 is coupled to a block 420 to determine if the D11 is a logic 1 or a 0. If D11 is a logic 1 and D12 is a logic 0 then K6 will be set (logic 1), and bits K7 and K5-K1 will be cleared (logic 0). Accordingly, one of the scale factor bits K5-K2 will be set if their corresponding denominator bit D10-D7 is the leftmost significant bit having a logic 1. Scale factor bit K1 and its compliment K1 is provided by inputting scale factor bits K7-K2 into circuitry of logic block 470. The logic block 470 sets K1 if none of the scale factor bits K7-K2 are set. By referring to schematic of FIG. 3, a person of the ordinary skill in the art can appreciate that only one of the output bits K7-K1 will be set, depending on the leftmost significant denominator bit having a logic 1. Therefore, for a denominator D having a range of 64 to 8191, the scale factor K can only assume one of the seven values of 1, 2, 4, 8, 16, 32 and 64. It should be noted that the circuit 400 of FIG. 3 may be implemented using other known logic circuit configurations to perform the same function.

Referring to FIG. 4, a preferred hardware implementation of scaling block 200 of FIG. 2 is shown. The scaling circuit 200 of FIG. 4 is a parallel binary shifter, which receives the denominator input bits D11-D0, and Scale factor bits K7-K1 to provide scaled denominator out put bits SD5-SD0. The range of denominator is 64 to 8191. The preferred scaling circuit 200 is primarily a switch matrix configuration including switch columns KD1 through switch column KD7.

Figure 5:
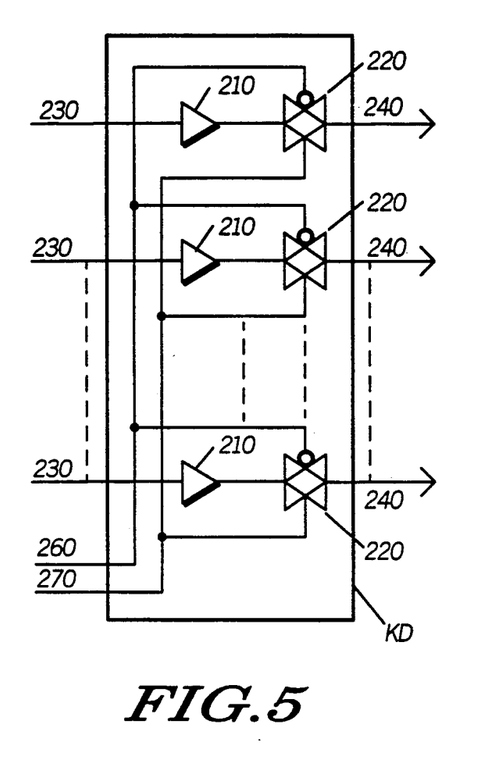
FIG. 5, is a schematic diagram of a switch column comprising known transmission gates.

Referring to FIG. 5, a schematic diagram a switch column KD is shown. The switch column KD comprises six independent CMOS transmission gates 220 coupled in series to CMOS buffer gates 210. The transmission gate 220 in association with buffer gate 210 constitute a independent switching mechanism for the switch column KD. Each switch has an input 230, and an output 240, and is controlled by two complementary control signals 260 and 270. The control signal 260 and its complement control signal 270 are provided to open or close the transmission gate 220. It is known that complementary control signals 260 and 270 provide for static operation, and low power consumption of CMOS transmission gate 220. The buffer gate 210 is provided in order to overcome input capacitance of the transmission gate 220, and increase switching speed. The control signals 260 of transmission gates 220 are coupled together. Similarly, complementary control signals 270 of transmission gates 220 are coupled together. The control signals 260 and 270 comprise the two complementary common controls of each switch columns KD7-KD1. Each switch column is controlled by a corresponding scale factor bit K7-K1 and its complement K7bar-K1bar. For ease of understanding, only scale factor bits K7-K1 will be referenced when describing the control of each switch column, and references to the complementary scale factor bits K7bar-K1-bar will be avoided. As described below, the input denominator bits D0-D11 are coupled to corresponding switch inputs 230, and scaled denominator outputs SD5-SD0 are coupled to corresponding switch outputs 240.

Now referring back to FIG. 4, switch column KD1 is coupled between D6-D0 and SD6-SD0, while switch column KD2 is independently coupled between D7-D1 and SD5-SD0. Similar switch columns KD3-KD7 independently couple subsequent 6 denominator bits to scaled denominator bits SD5-SD0. Setting of any scale factor bits K7-K1 closes the corresponding switch column. As described previously only one of the scale factor bits K7-K1 is set at a time, therefore only one of the switch columns KD7-KD1 is closed. The scaling circuit 200 shifts to the right the denominator bits D11-D0 by a number of bit determined by scale factor K. Mathematically the above operation can be described by equation:

$$SD = D/K \qquad (1)$$

Accordingly, for a denominator D of 8191, the scale factor K is equal to 64, and scaled denominator SD is equal to 127. Similarly, for a denominator D of 64, the scale factor K is equal to 1, and the scaled denominator SD is equal to 64. Therefore, for the specified denominator range, the scaled denominator SD is always a number between 64 to 127.

Scaled denominator bits SD5-SD0 represent a quasi scaled denominator value SD', and the scaled denominator SD is determined by the equation:

$$SD = 64 + SD' \qquad (2).$$

This relation ship is due to the fact that, the most significant bit of the scaling result (64 to 127) is always a 1, and does not appear in the scaled denominator bits SD5-SD0. Accordingly, the most significant bit D12 is not coupled to scaling circuit 200. Because, D12 is a don't care value unless it is a logic 1 (otherwise the value of the denominator D can be represented by D11-D0). Even if denominator bit D12 is a logic 1, then scale factor K is 64, and the desired result for scaled denominator SD may be obtained according to equation 2. In other words, when D12 is a logic 1, its significance is embedded in equation 2. For every value of scale factor K (i.e. seven values), within the specified denominator range, the quasi scaled denominator SD' will repeatedly assume a value between the range of 0 to 63. The following examples describes two distinct denominator ranges of 4096 to 8191, and 64 to 127.

First, assuming denominator value of 4096 (binary 1,0000,0000,0000), then K7 is set (D12 is logic 1). Therefore, the denominator bits D11-D6 is connected to scaled denominator bits SD5-SD0, making SD' equal to 0. Similarly, assuming a denominator value of 8191 (binary 1,1111,1111,1111), K7 remains set, and the quasi scaled denominator SD' is equal to 63. Therefore, for the denominator range of 4096 to 8191, the quasi scale denominator SD' is within a range of 0 to 63.

Second, assuming a denominator value of 64 (binary 0,0000,0100,0000), then K1 is set (D6 is the leftmost logic 1). Thus, the denominator bits D5-D0 is connected to scaled denominator bits SD5-SD0, making SD' equal to 0. Finally, assuming denominator value of 127 (binary 0,0000,011,1111), K7 remains set, and the scaled denominator SD is equal to 63. Again, for the denominator range of 64 to 127 the quasi scale denominator SD' is within a range of 0 to 63. The same discussion applies for every possible range within which K7-K1 is set.

Referring to FIG. 6, a scaling circuit 300, similar to the circuit 200 as described FIG. 3, is shown. The input numerator bits N14-N1 and scale factor bits K7-K1 are coupled to the scaling circuit 300 to provide a scaled numerator output SN represented by scaled numerator bits SN7-SN0. Switch columns KN7-KN1 couple numerator bits N14-N1 to scaled numerator bits SN7-SN0. Switch column KN1-KN7 each comprise 8 independent switches 320, and are similar to switch column KD as described in FIG. 5. The scale factor used for scaling the numerator N is equal to 2K. A person of ordinary skill in the art will appreciate that this additional scaling is simply accomplished by ignoring bit SN0.

In the preferred hardware implementation of the circuit 300, the switch column KN1 is coupled between N8-N1 and SN7-SN0. The switch column KN2 is independently coupled between N9-N2 and SN7-SN0. Similar switch columns KN3-KN7 independently couple subsequent 8 numerator bits to scaled numerator bits SN7-SN0. Setting of any scale factor bits K7-K1 closes the corresponding switch column. As described previously only one of the scale factor bits K7-K1 is set at a time, therefore only one of the switch columns KN7-KN1 is closed. The numerator scaling circuit 300 shifts to the right the numerator bits N14-N1 by a number of bit determined by scale factor K.

In operation, the numerator N will be scaled by a scale factor of 2K. The numerator bit N15 constitutes the sign bit for the numerator N. The bit N15 is ignored in the hardware implementation, because the numerator is confined within the range of −16,384 to 16,383, and Therefore, the sign bit is present on numerator bit N14. The scaled denominator SN will always be within the range of −128 to 127. In order to increase the range of the numerator to −32,768 to 32,767, a truncation circuit (not shown) may be used to carry the sign bit and insure a scaled numerator SN in the range of −128 to 127. Mathematically the above operation may be described by the equation:

$$SN = N/2K \qquad (3).$$

Figure 7:
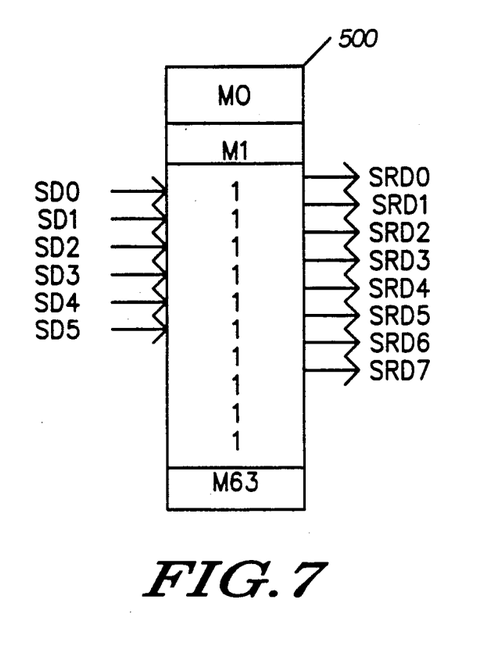
FIG. 7, is a diagram of a 64 byte read only memory (ROM).

Referring to FIG. 7, The preferred hardware implementation of reciprocating block 500 of FIG. 2 comprise a Read Only Memory 500 (ROM). The ROM 500 is a 64 byte fully static CMOS memory. The ROM 500 stores scaled denominator reciprocals SRD, represented by bits SRD7-SRD0. Scaled denominator bits SD5-SD0 address one of memory locations M0-M63 of the ROM 500. Each memory locations M0-M63 comprise an 8-bit number, which will appear at the data bus when addressed. The ROM 500 serves as a look up table to store a representation of the reciprocal of the 64 possible values (64 to 127) of the scaled denominator SD. The content of the memory locations M0-M63 are each equal to the reciprocal of each scaled denominator SD multiplied by a constant 8192 (2 13). For the reasons described in the description of block 500 of FIG. 2, the constant value 2 13 has been chosen so that reciprocals of scaled denominator SRD also fall within the range of 64 to 127. Mathematically this operation may be described by the equation:

$$SRD = 2^{\wedge}13/SD, \quad (4)$$

and substituting equation (1) for SD:

$$SRD = 2^{\wedge}13*(K/D). \quad (5)$$

Accordingly, M0 contains reciprocal of 64 (0+64) multiplied by 8192, which is equal to 127 (after truncation). Similarly, M63 contains reciprocal of 127 (63+64) multiplied by 8191 which is equal to 64 (after truncation), and so on. Since the SRD can be represented by 7 bits, therefore the bits SRD7 is set to a logic 0.

Figure 8:
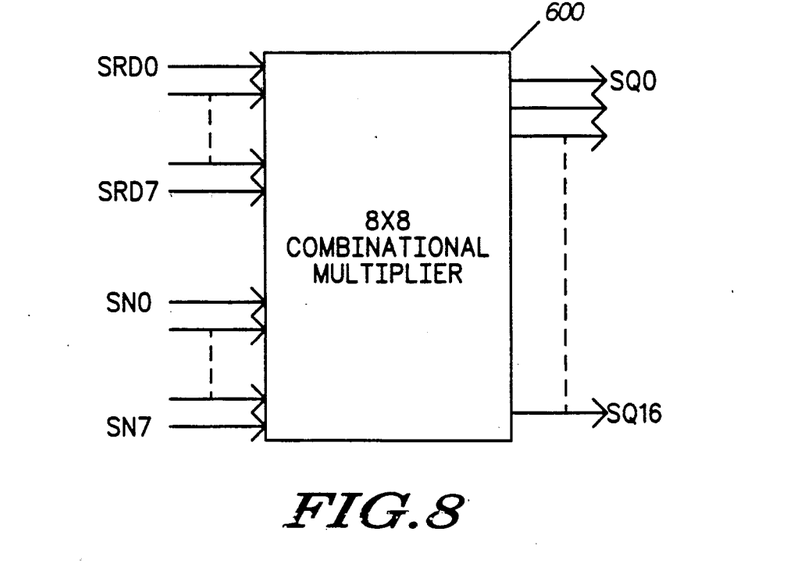
FIG. 8, is a diagram of a combinational modified booth 8-bit by 8-bit multiplier.

Referring to FIG. 8, a block diagram of a combinational modified booth multiplier 600 is shown. The multiplier 600 is a 8-bit by 8-bit multiplier having a 16-bit output. The multiplier 600 may be any suitable modified booth combinational multiplier such as the one fully described in U.S. Pat. No. 4,575,812, the disclosure of which is hereby incorporated by reference. Inputs of the multiplier 600 comprise the scaled denominator reciprocal bits SRD7-SRD0, and the scaled numerator bits SN7-SN0. The output of the multiplier 600 is a 16 bit scaled quotient SQ represented by SQ15-SQ0. Mathematically the scaled quotient is described by:

$$SQ = SN*SRD. \quad (6)$$

The post scaling block 700 of FIG. 2 may be required due to various scaling used in performing the division operation. In the preferred embodiment of divider 100, the scaled quotient SQ is post scaled by a factor of $2^{\wedge}6$. In hardware, the post scaling does not require any circuitry, and is simply implemented by ignoring the 6 least significant bits of the scaled quotient SQ, in order to provide the desired quotient Q. Considering equations (3), (4), (5), and (6), the quotient Q may be described by the following equations:

$$Q = SQ/2^{\wedge}6;$$

or $$Q = SN*SRD/2^{\wedge}6;$$

or $$Q = [N/2K]*[2^{\wedge}13*(K/D)]/2^{\wedge}6;$$

or $$Q = 2^{\wedge}6*(N/D).$$

The scaling factor of block 700 is arbitrary, and may be determined by the application wherein the divider circuit is used.

The hardware implementation of the divider circuit 100 as described, provides a totally combinational circuit. Accordingly, the divider circuit 100 has a substantially lower propagation delay than the clock period of the signal processing circuit. Therefore, a division operation is executed within one clock cycle. For reasons described below, the divider circuit 100 also provides a controlled error in the result for a wide range of inputs. The truncation of scaled denominator (range of 64 to 127), and reciprocal of scaled denominator (range 127 to 64) are the primary source of error in the resulting quotient. Assuming, the result of scaling a denominator D by a factor of K produces an actual scaled denominator of 68.49. This scaled denominator will be truncated to produce an integer scaled denominator value of 68, thereby introducing an error. According to the description of circuit 500 of FIG. 7, the scaled denominator reciprocal SRD is produced by 8192/68 which is truncated to a value of 120, therefor introducing additional error. The total error is a finite value, and depends on the resolution of integers from 64 to 127. If smaller error is required the circuit design of divider 100 may be modified to produce scaled denominator values in the range of 128 to 255. This will produce twice the resolution, compared to the preferred divider circuit 100. The later, obviously requires a 128 byte memory for storing the additional data. As can be seen, the divider circuit 100 may be designed to produce a controlled error over a wide range of inputs.

A person of ordinary skill in the art will appreciate that, the block diagram of the divider 100 may be implemented in a software program of a commercially available microcomputer. The software program may be implemented in a low level programming language, such as a assembly for any suitable microprocessor, or a high level programming language such as FORTRAN.

What is claimed is:

1. An apparatus for providing binary signals representative of a number approximating quotient of two numbers represented by a numerator signal and a denominator signal within a single clock cycle, comprising:

a first combinational logic device coupled to said denominator signal for generating a scale factor signal in accordance with magnitude of said denominator signal to scale said denominator signal to be within a predetermined range;

a second combinational logic device coupled to said denominator signal and said scale factor signal for generating a scaled denominator signal representative of a number within said predetermined range derived from scaling said denominator signal by said scale factor signal;

a memory device being addressed by said scaled denominator signal having stored therein signal representations corresponding to reciprocals of said scaled denominators within said predetermined range;

combinational multiplier device being coupled to said memory device for multiplying said signal corresponding to reciprocal of said scaled denominator by said numerator signal.

2. The apparatus of claim 1, wherein said second combinational logic device comprises means for right shifting said denominator signal.

3. The apparatus of claim 1, further including a third combinational logic device coupled to said numerator signal and said scale factor signal for generating a scaled numerator signal, and wherein said combinational multiplier device multiplies said signal corresponding to reciprocal of said scaled denominator by said scaled numerator signal.

4. The apparatus of claim 1, wherein said combinational multiplier means comprises a booth multilier.

* * * * *